Feb. 4, 1969  P. W. GLASER ET AL  3,425,571
MEANS FOR FEEDING COMPACTS ONTO A CONVEYING SURFACE
Filed Oct. 21, 1966
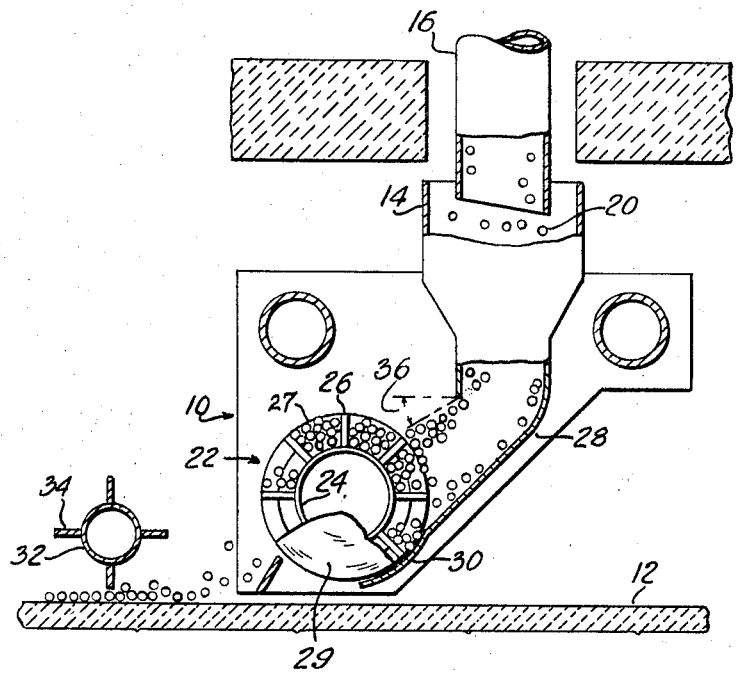
Fig.1
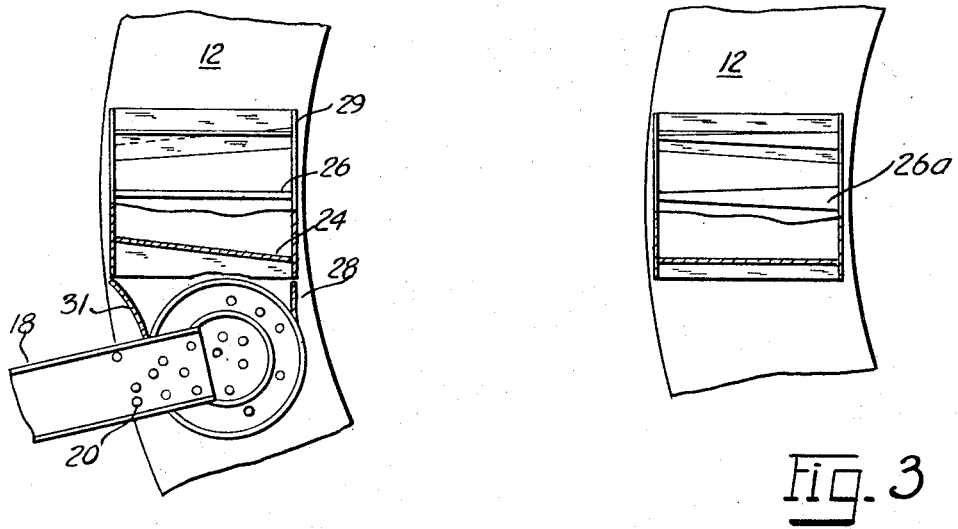
Fig.2
Fig.3
INVENTORS
Paul W. Glaser
Ira D. Boynton
BY

United States Patent Office 3,425,571
Patented Feb. 4, 1969

3,425,571
MEANS FOR FEEDING COMPACTS ONTO A CONVEYING SURFACE
Paul W. Glaser, Islington, and Ira Dana Boynton, Lexington, Mass., assignors, by mesne assignments, to Midland-Ross Corporation, Toledo, Ohio, a corporation of Ohio
Filed Oct. 21, 1966, Ser. No. 588,593
U.S. Cl. 214—35          4 Claims
Int. Cl. F23k 3/00; F27b 9/00; B65g 47/12

ABSTRACT OF THE DISCLOSURE

Apparatus is provided for uniformly feeding compacts onto the surface of an annular conveying plane. The apparatus comprises a metering drum whose capacity for conveying pellets increases in proportion to the radius of the annular surface. The metering drum and its associated feed hopper are constructed and arranged so that the pellets are not crushed as they are picked up by the metering drum.

---

This invention relates to an apparatus for feeding compacts onto a conveying plane, and, more particularly, to means for feeding compacts a preferred, constant depth on a furnace hearth so that the hearth is uniformly covered with the compacts.

During the processing of compacts, problems often arise in placing these compacts on a conveying plane that is annular or circular. This problem is caused by the variance in surface area of the conveying plane because of the difference in arcuate length between the inside diameter and outside diameter of the plane. The use of the term compacts throughout the following specification and claims is intended to include particulate material to which a heat treat process is to be applied. As an example, in the processing of iron ore pellets as disclosed by Huebler and Beggs in U.S. Patent No. 2,793,109, particulate material comprising iron oxide and carbon is moistened, formed into generally spherical compacts, dried in an oven to form green compacts, then heated in a furnace to a temperature in excess of 2000° F. to indurate the compacts. For induration of the compacts, a rotary hearth furnace has been found to be particularly adaptable and it is advantageous from a process standpoint to have the compacts uniformly distributed on the rotary hearth from one to two layers deep so that all the compacts are subjected to substantially the same quantity of heat as they are carried through the reaction zones of the furnace. In addition, it is obviously advantageous to have the entire surface of the rotary hearth filled with the compacts so that the capacity of the furnace may be fully realized. The task of supplying compacts uniformly over a hearth surface in a preferred layered thickness is rendered difficult because of the difference in surface area as the hearth extends from its inside to outside diameter, and also because of the tendency of the compacts to roll as they are deposited on the hearth.

It is, therefore, an object of this invention to provide a novel apparatus for feeding compacts onto the hearth of a rotary hearth furnace.

It is a further object of this invention to provide means for supplying compacts one to two layers deep on a rotary hearth in a uniform manner.

It is another object of this invention to provide means for feeding particulate material onto a bed having a variable surface area relative to the dimensions of the feeding means.

Another object of this invention is to supply a novel feeding apparatus for feeding compacts to a surface that moves relative to the apparatus.

It is still a further object of this invention to provide means for feeding fragile compacts onto a hearth in a manner that will not crush the compacts.

It is another object of this invention to meter the quantity of compacts supplied to a hearth.

In one embodiment of this invention, compacts are supplied to a hopper from an oven, where they are dried after being compacted. Below the level of the hopper, a distance away from the axis of the hopper, is a metering drum which is disposed radially across the hearth of a rotary hearth furnace. A chute extends from the bottom of the hopper to the lower portion and sides of the metering drum to direct compacts from the hopper to the drum. The metering drum comprises a tapered cylindrical member and a plurality of circumferentially spaced blades extending outwardly from the cylindrical member along the entire length thereof. The blades are also tapered so that the outer edge of each blade is equidistant from the center of the drum along its entire length, while the height of each blade increases as it extends from the inside diameter of the hearth to the outside diameter. Thus, the compartments formed by the blades and the drum vary in depth along the length of the drum. In this way, the variance in volume of each compartment due to the taper of the cylindrical member compensates for the difference in hearth area that results from the inside diameter of the annular hearth being smaller than the outside diameter. The metering drum is sufficiently close to the hearth, and has a relatively small diameter, so that the compacts do not fall a great distance and are thus not fractured as they are dropped on the hearth. Downstream from the metering drum is a second, smaller drum which rotates in the same direction as the metering drum. This second drum has blades that extend above the hearth slightly more than a distance equal to one or two diameters of the individual compacts, depending upon the preferred thickness, and acts as a barrier to compacts which may be resting on others to push them back until such time as a space between those compacts forming the first few layers allows the excess compacts to fall into an opening. The rotational speed of the metering drum is adjusted so that the supply of compacts to the hearth, whose rotational speed is normally fixed, is constant and equal to the number which will completely cover the surface of the hearth to the depth desired, such as one or two layers deep.

In the drawing:

FIG. 1 is a view, in section, of a hearth feeding encompassing the principles of this invention.

FIG. 2 is a plan view of the hearth feeder of this invention, with a partial view of a rotary hearth.

FIG. 3 is a plan view of another type of metering drum utilizing the features of this invention.

Referring now to the drawing, a feeding apparatus is shown generally at 10 disposed above the hearth 12 of a rotary hearth furnace. The feeding apparatus comprises a hopper 14 placed above the rotary hearth 12, which hopper receives a feed pipe 16 disposed at the end of a belt 18. Compacts 20 are fed to the belt 18 from a drying oven (not shown) and are conveyed along the belt into the feed pipe 16 and into the hopper 14, where the compacts are gathered until a sufficient quantity are contained within the hopper. Placed below the hopper 14 at a distance from the axis thereof, and disposed radially across the rotary hearth 12 is a metering drum 22. The metering drum 22 has a tapered cylindrical member 24 whose diameter is larger at the end nearest to the inside diameter of the hearth 12 and contains a plurality of circumferentially spaced blades 26 that extend the length of the metering drum to form compartments 27 therebetween. The blades 26 are also tapered so that the outside edge of the blades is equidistant from the center of the drum along the length thereof, but the depth of the compartments 27 vary longitudinally. The depth of each compartment 27 increases as the drum 22 extends from the inside diameter of the hearth 12 to the outside diameter thereof in direct proportion to the increase in surface area of the hearth over the same distance. A pair of disks 29 are attached, one at each end, to the metering drum 22 to prevent the compacts 20 from spilling over the side of the drum. Extending from the bottom of the hopper 14, to a position below the metering drum 22, is a chute 28 having a bottom portion 30 which conforms to the dimensions of the metering drum 22 and sides 31. Means (not shown) is provided to rotate the metering drum in a counterclockwise direction as seen in FIG. 1. Downstream from the metering drum is a compact leveler in the form of a second drum 32 also having circumferentially spaced blades 34. Means (not shown) are also provided for rotating the second drum in the same direction as the metering drum 22.

After a sufficient number of compacts is fed into the hopper 14, the metering drum 22 is rotated in a counterclockwise direction and the blades 26 pick up the compacts 20 that are resting on the chute 28. Since the metering drum 22 is spaced relative to the axis of the hopper 14, the compacts 20 that are engaged by the blades 26 are not stacked vertically; therefore, they are not subject to a dead load and can move relatively freely. More specifically, the compacts 20 are lifted from the lower end of a free surface angle of repose 36. Thus the blades can pick up the compacts 20 without shearing or crushing a number of them as it does so. The blades 26 project to an extent sufficient to pick up only a proper number of compacts 20, and as the metering drum rotates, these compacts are eventually deposited on the rotary hearth 12. The taper of the cylindrical member 24 is provided to compensate for the difference in surface area of the hearth resulting from the difference in arcuate length between the inside diameter of the rotary hearth and the outside diameter. Since the metering drum 22 has a cylindrical member 24 which is tapered and blades 26 whose radius is constant along the length of the drum, the portion of the drum 22 at the outside diameter of the hearth 12 will pick up more compacts than will the portion of the drum at the inside diameter of the hearth. In this way, a proper number of compacts may be provided to the hearth in a proper relationship relative to the radial distance of the rotary hearth, by coordinating the rotation of the drum to the height of the blades 26 and the rotation of the hearth 12.

After the compacts 20 are dried in the oven, they are relatively fragile. The metering drum is sufficiently close to the hearth 12 and has a relatively small diameter so that the compacts do not have a great distance to fall, and thus the fragile compacts are not crushed as a result of the fall. When it is desired to control the depth of compacts 20 on the rotary hearth 12 to a single layer, the elevation of the second drum 32 is adjusted so that the vertical space between the rotary hearth 12 and the blades 34 is slightly greater than the diameter of the compacts 20 and the rotation of the drum is adjusted to supply the proper number of compacts. In operation, the blades 34 of the second drum 32 will push back any compacts which are supported on this layer of compacts and the excess compacts are continually forced behind drum 32 and will not pass until such time as it finds an opening within the layer of compacts to rest upon the hearth.

If it is desirable to have a deeper layer of say two compacts thick, the second drum 32 may be raised above the hearth the proper distance and the rotation of the metering drum 22 may be increased to an extent to supply the proper number of compacts to the hearth. It is thus obvious that an apparatus is provided which supplies compacts to a rotary hearth in a uniform manner of any desired depth but usually restricted to one to two layers deep. The layer thickness may be controlled by the distance the second drum 32 is positioned from the top of the rotary hearth 12.

In the previous embodiment of the invention the metering drum 22 had a tapered cylindrical member 24 and blades 26 whose radial distance from outer end to outer end were equal relative to the axis of the drum. It is obvious that the two may be modified so that the cylindrical member 34a forms a right cylinder and the widths of the blades 26a are tapered longitudinally to vary the cross sectional area of each compartment relative to its length. This alternate embodiment is shown in FIG. 3.

Although only the preferred embodiments of this invention have been shown and described, it is understood that changes and modifications can be made therein and this description is illustrative only and not for the purpose of rendering this invention limited to the details illustrated or described.

We claim:
1. An apparaus for supplying compacts to an annular rotary hearth comprising: a hopper for receiving compacts; a drum extending substantially radially over the hearth at a level below said hopper; means forming a plurality of circumferentially disposed, longitudinally extending compartments about the perimeter of said drum, each increment of said compartments increasing in volume in proportion to its distance from the hearth axis, means for rotating said drum; and a chute extending from said hopper to said drum, whereby compacts are conveyed from said hopper to said drum.

2. The apparatus of claim 1 wherein said drum is spaced relative to the axis of said hopper and the compacts within said chute form an angle of repose before engaging said drum.

3. The apparatus of claim 1 including means disposed above the hearth and downstream from said drum for leveling the compacts placed upon the hearth.

4. In an apparatus for supplying compacts to an annular rotary hearth, the combination comprising: a hopper; means for supplying compacts to said hopper; a drum spaced relative to the axis of said hopper and extending substantially radially over the hearth at a level below said hopper; means forming a plurality of circumferentially disposed, longitudinally extending compartments about the perimeter of said drum, each increment along the length of said compartments increasing in volume in proportion to its distance from the hearth axis; a chute extending from said hopper to said drum, wherein compacts are collected and form an angle of repose; and means for rotating said drum whereby said compartments receive compacts from said chute and upon rotation of said drum deposit the compacts completely over the hearth surface with a uniform layer thickness.

References Cited

UNITED STATES PATENTS

| | | | |
|---|---|---|---|
| 2,907,444 | 10/1959 | Smith | 198—211 |
| 1,723,211 | 8/1929 | Schmidt. | |
| 2,603,471 | 7/1952 | McDonald | 214—21 |
| 3,074,568 | 1/1963 | Mambourg et al. | 214—18 |
| 3,160,402 | 12/1964 | Meyer et al. | 263—28 |

ROBERT G. SHERIDAN, *Primary Examiner.*

U.S. Cl. X.R.

198—62; 263—28; 266—21